United States Patent [19]
Watson

[11] Patent Number: 5,829,146
[45] Date of Patent: Nov. 3, 1998

[54] AUTOMOTIVE MEASURING DEVICE HANGER

[75] Inventor: James Sherman Watson, Brunswick, Ga.

[73] Assignee: Grabber Manufacturing Co., Inc., Brunswick, Ga.

[21] Appl. No.: 774,463

[22] Filed: Dec. 30, 1996

[51] Int. Cl.$^6$ .................................................... G01B 5/24
[52] U.S. Cl. ............................................ 33/288; 33/608
[58] Field of Search ...................................... 33/288, 608

[56] References Cited

U.S. PATENT DOCUMENTS

| | | | |
|---|---|---|---|
| 3,786,572 | 1/1974 | Larson | 33/608 |
| 4,049,230 | 9/1977 | Minniear | 248/539 |
| 4,055,061 | 10/1977 | Bayorgeon et al. | 33/288 |
| 4,319,402 | 3/1982 | Martin | 33/608 |
| 4,573,273 | 3/1986 | Eck | 33/288 |
| 5,507,101 | 4/1996 | Mason | 33/288 |

*Primary Examiner*—Thomas B. Will
*Attorney, Agent, or Firm*—James B. Middleton

[57] ABSTRACT

A measuring device hanger is engageable with one of the standard holes in a vehicle body, and suspends a conventional measuring device therefrom. A head is small enough to pass through the smallest of holes in a vehicle body; and, the head is expansible to lock within the largest of holes in a vehicle body. The head is in two parts, one part being on each of two jaws. The jaws are pivotal away from each other to separate the two parts of the head to lock the head within a hole. A body mounts a shaft fixed with respect to the body. The shaft carries a threaded stud which extends through a cam block. Thus, as the body and the shaft are rotated, the threaded stud rotates to move the cam block and urge the jaws away from each other. The body defines a hole that receives the standard measuring device, and a set screw secures the measuring device.

6 Claims, 1 Drawing Sheet

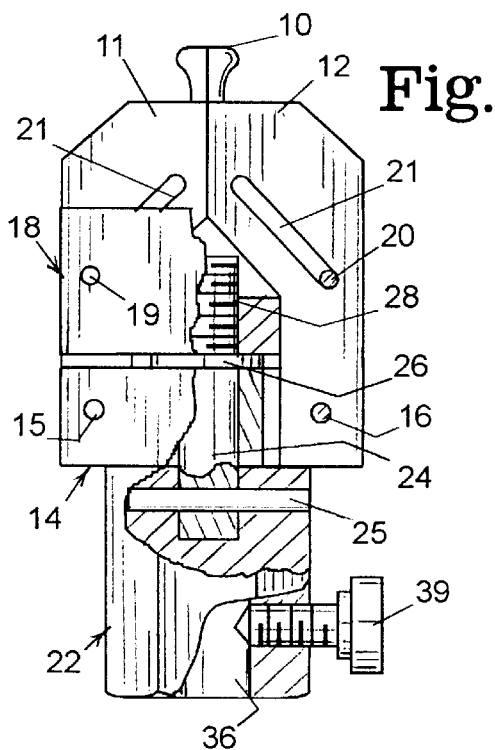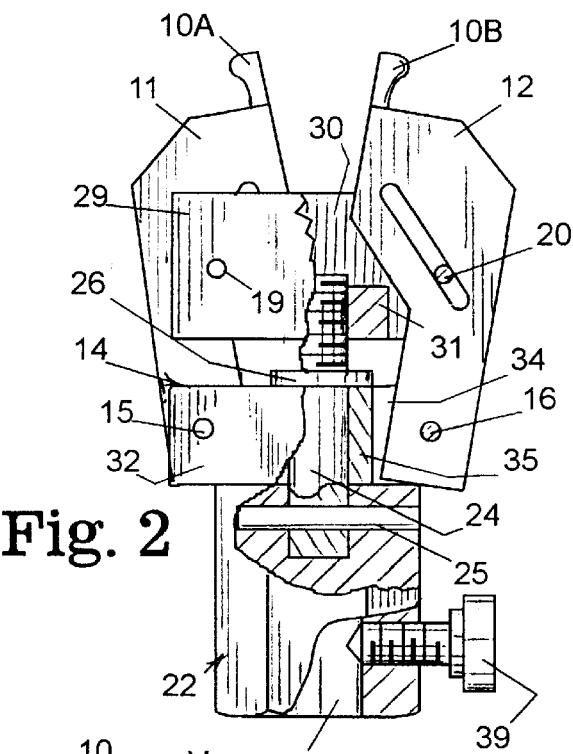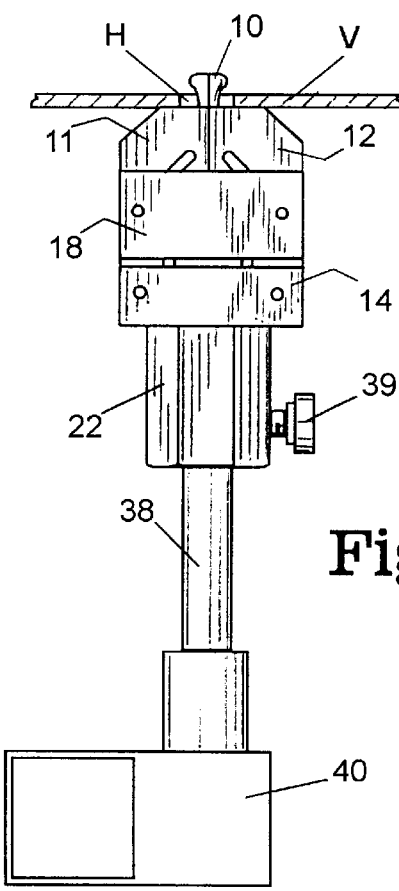

AUTOMOTIVE MEASURING DEVICE HANGER

BACKGROUND OF THE INVENTION

1. Field of the Invention

This invention relates generally to measuring apparatus and methods, and is more particularly concerned with a measuring system for use when straightening an automotive vehicle.

2. Discussion of the Prior Art

When an automotive vehicle has been involved in a collision or the like, the body of the vehicle is bent, and must be straightened. Furthermore, the vehicle is frequently no longer generally rectangular, but is in the shape of a parallelogram wherein the angles are not 90°. Thus, in repairing a vehicle after a collision, the various body parts must be straightened or replaced, but the body itself must be straightened and realigned. Each car manufacturer has certain specifications so a mechanic can determine when the vehicle is properly straightened by taking certain measurements and comparing the measurements with the manufacturer's specifications.

The prior art system for measuring a vehicle utilizes measuring devices supported from the floor, or from a rack that carries the vehicle. The prior art system is somewhat complex and time consuming to use because the measuring device must be appropriately supported, and must be moved up to the vehicle reference points. One must generally measure at all four corners of the vehicle, so the system can be quite time consuming.

SUMMARY OF THE INVENTION

The present invention provides a measuring system for an automotive vehicle wherein at least one measuring device is suspended from the vehicle itself. As a result, the apparatus for supporting and adjusting the measuring device is not required, as the measuring device is already in place on the vehicle.

The measuring device hanger of the present invention comprises a head that is receivable in a hole in the vehicle frame, the head then being expansible to be locked in the hole. The head is carried by a pair of jaws that are pivotal towards and away from each other for expanding and contracting the head. The jaws are controlled by a cam means so the jaws can be set as needed, and retracted when the device is to be removed. A lower body controls the cam means, and receives a conventional measuring device.

BRIEF DESCRIPTION OF THE DRAWINGS

These and other features and advantages of the present invention will become apparent from consideration of the following specification when taken in conjunction with the accompanying drawings in which:

FIG. 1 is a front elevational view of a measuring device hanger made in accordance with the present invention, the device being partially broken away to show the construction;

FIG. 2 is a view similar to FIG. 1 but showing the head expanded; and,

FIG. 3 is a front elevational view of the device shown in FIG. 1, but on a reduced scale and having a measuring device supported thereby.

DETAILED DESCRIPTION OF THE EMBODIMENT

Referring now more particularly to the drawings, and to that embodiment of the invention here presented by way of illustration, FIG. 1 shows the head 10 mounted on two pivoted jaws 11 and 12. The jaws 11 and 12 are pivoted on the pivot block 14 at pivots 15 and 16 respectively. Above the pivot block 14 there is a cam block 18 having two cam axles 19 and 20 passing therethrough. As is better seen on the jaw 12, the jaws define cam slots 21 for receiving the cam axles 19 and 20.

The lower body 22 is fixed to the jaws 11 and 12 by means of a shaft 24 which passes through the pivot block 14 and into an opening in the body 22. A pin 25 passes through the body 22 and the shaft 24 to hold the shaft 24 in position. It will be seen that a flange 26 is fixed to the shaft 24 and engages the top surface of the pivot block 14, so the pivot block 14 can rotate about the shaft 24, but without movement along the centerline of the shaft.

Looking now at both FIG. 1 and FIG. 2, it will be noticed that, above the flange 26, there is a threaded stud 28 integral with the shaft 24. The threaded stud 28 threadedly engages a hole through the cam block 18 so that, with rotation of the shaft 24 and the stud 28, the cam block 18 will move up or down with respect to the pivot block 14. As the cam block 18 moves up, the cam axles 19 and 20 move up, forcing the jaws 11 and 12 outwardly as the axles 19 and 20 move along the cam slots 21.

In FIG. 2 of the drawings it can be seen that the head 10 comprises two parts, one part being on each of the jaws 11 and 12. When the jaws 11 and 12 are contiguous as shown in FIG. 1, the head 10 is small enough to be received in the smallest of the standard holes in vehicle bodies. When the jaws 11 and 12 are pivoted away from each other as shown in FIG. 2, the head 10 expands by having its two parts 10A and 10B move away from each other. The head parts 10A and 10B can be moved apart sufficiently to be held in the largest of the standard holes in vehicle bodies.

FIG. 2 also shows more clearly that the cam block 18 is made up of front and rear flanges 29 and 30, which carry a block 31 therebetween. It is the block 31 that defines the threaded hole for the stud 28. The cam axles 19 and 20 pass through the two flanges 29 and 30, and through the jaws 11 and 12 which are between the flanges.

The pivot block is similar to the cam block in that it comprises front and rear flanges 32 and 34, with a block 35 therebetween. The block 35 defines a hole for receiving the shaft 24.

The lower body 22 defines a hole 36 for receiving a measuring pointer or the like shown at 38 in FIG. 3. A screw 39 can be tightened against the pointer to hold it in place. Thus, FIG. 3 shows the hanger of the present invention with the head 10 inserted through a hole H in a vehicle body indicated at V. When the head 10 is in the hole H, the body 22 will be rotated, thereby rotating the shaft 24 and the stud 28. The block 31 will then move up on the stud 28, and the cam axles 19 and 20 will move within the cam slots 21 to urge the jaws 11 and 12 apart, carrying the head parts 10A and 10B with them. When the head 10 is secured in the hole H, the pointer 38 and associated measuring apparatus 40 can be attached to the body 22 as described.

It will thus be seen that the present invention provides a convenient hanger for supporting measuring devices from the vehicle itself. The hanger is quite versatile since it can be supported from any of the usual holes in a vehicle body, and can then receive a wide variety of measuring apparatus.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. In a system for measuring a vehicle for alignment of the frame of said vehicle, wherein at least one measuring device is disposed adjacent to said vehicle, the improvement comprising at least one hanger, said vehicle defining a plurality of holes therein, said hanger being selectively engageable with one of said plurality of holes, and means on said hanger for carrying said at least one measuring device, and including a head receivable within said one of said plurality of holes, and means for causing expansion of said head for locking said head within said holes, and wherein said hanger includes a pair of jaws, each jaw of said pair of jaws mounting a portion of said head, said jaws being movable towards and away from each other for selectively separating said portions of said head for locking said head in said hole, and wherein said hanger includes a cam block, said jaws defining cam slots therein, cam axles extending through said cam block and said cam slots in said jaws, and means for moving said cam block for causing motion of said jaws.

2. In a system as claimed in claim 1, the improvement wherein said hanger includes a lower body, a shaft fixed to said lower body, and a threaded stud coaxial with said shaft, said cam block defining a threaded hole therein for receiving said stud, so that rotation of said shaft causes linear motion of said cam block.

3. A hanger, for a measuring device for measuring the alignment of an automotive vehicle, said hanger comprising a head selectively receivable in a hole defined in the body of a vehicle to be aligned, means for expanding said head for securing said head within said hole defined in the body of vehicle, said hanger including a lower body for selectively receivable said measuring device, a pair of jaws mounted on said lower body and pivotal towards and away from each other, said head being fixed to said jaws and constituting means for fixing said jaws to said body of a vehicle, and cam means for selectively causing pivotal motion of said jaws, wherein said cam means comprises cam slots defined in said jaws, cam axles carried by said cam block and passing through said cam slots, and screw means for moving said cam block.

4. A hanger as claimed in claim 4, and including a shaft secured to said lower body, and a threaded stud fixed to said shaft and threadedly engaging said cam block, said threaded stud constituting said screw means.

5. A hanger as claimed in claim 4, said lower body defining a hole therein for receiving a measuring device, and locking means for retaining said measuring device in said hole.

6. A hanger as claimed in claim 5, said head comprising two parts, each part of said two parts being carried by one jaw of said pair of jaws, so that as said jaws are pivoted away from each other, said parts of said head are moved away from each other.

\* \* \* \* \*